May 6, 1969

A. J. PRITCHARD 3,442,184

PISTON PIN SILENCER

Filed Sept. 15, 1967

ARNOLD J. PRITCHARD
*INVENTOR.*

BY

*Robert K. Rhea*
AGENT

United States Patent Office 3,442,184
Patented May 6, 1969

3,442,184
PISTON PIN SILENCER
Arnold J. Pritchard, Box 614,
Carnegie, Okla. 73015
Filed Sept. 15, 1967, Ser. No. 667,988
Int. Cl. F16j 1/14
U.S. Cl. 92—187                              5 Claims

ABSTRACT OF THE DISCLOSURE

A substantially U-shaped bracket straddles the piston connected end of a piston rod and is fulcrumed against the piston pin by a projection, extending laterally of the respective leg of the bracket adjacent its bight portion, which contacts the upper surface of the respective piston pin reinforcing lug while the free end portions of the bracket legs are resiliently connected by springs with an edge forming an aperture in the piston wall adjacent the piston ring land.

Background of the invention

The present invention relates to combustion engine pistons and more particularly to a wrist pin silencer.

The reciprocating piston in a combustion engine is connected to the piston rod by a wrist pin journaled by bearing surfaces formed in wrist pin bosses on opposite walls of the piston. The wrist pin and bearing surfaces wear and the resulting looseness creates an undesirable noise in the engine which is caused by the change in direction of the piston. Heretofore this undesirable noise of the wrist pin within its bearing surfaces has been overcome by the installation of new wrist pins or usually an oversized wrist pin. When an oversized wrist pin is installed it is usually necessary to hone out the bore forming the wrist pin bearing surface to achieve the desired close tolerance fit. This adds to the cost of engine repair and it is desirable that a relatively inexpensive means be provided for silencing the noise of worn wrist pins with a minimum of expense.

It has been proposed to install certain devices within a piston to expand the piston wall or skirt to prevent the resultant noise or piston "slap" against the cylinder wall. Some of these devices have resilient members which bear against the wrist pin for the added feature of silencing wrist pin noises, however, for the most part these devices have proved ineffective in silencing wrist pins for the reason that most of the resistance offered by the device is directed toward the inner surfaces of the piston skirt. This invention, on the other hand, straddles the piston rod and is constantly fulcrumed against the piston pin to maintain it in contact with its bearings.

Summary of the invention

A substantially U-shaped bracket, having relatively thin legs, straddles the wrist pin connected end of a piston rod and is fulcrumed against the piston pin by a pair of outstanding lugs connected, respectively, to the legs of the bracket and bearing against an adjacent surface of the respective piston wrist pin reinforcing lugs and a pair of springs connected, respectively, with the free end portion of the bracket legs and an edge surface of the piston forming apertures adjacent the piston ring land. Thus the springs constantly maintain a force against the wrist pin.

It is, therefore, the principal object of this invention to provide an attachment for existing pistons and wrist pins which is fulcrumed against the wrist pin to maintain contact between the wrist pin and its bearings.

Description of the preferred embodiment

Figure 2:
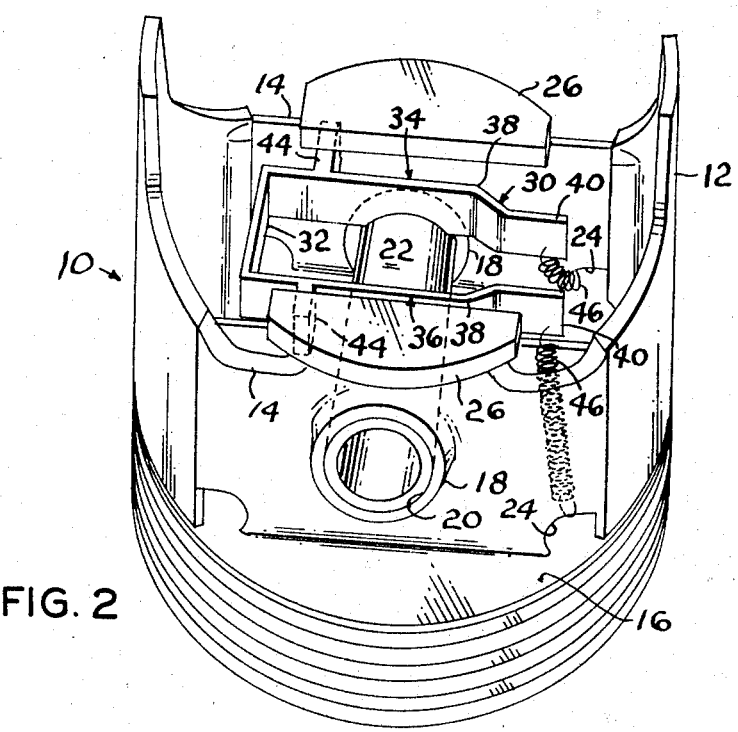
FIGURE 2 is a perspective view of an inverted conventional piston having the device installed thereon.
Figure 3:
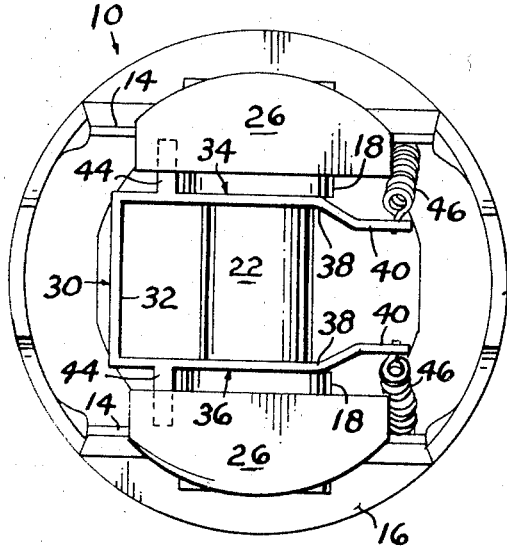
FIGURE 3 is a bottom plan view of a piston with the device in place.
Figure 1:
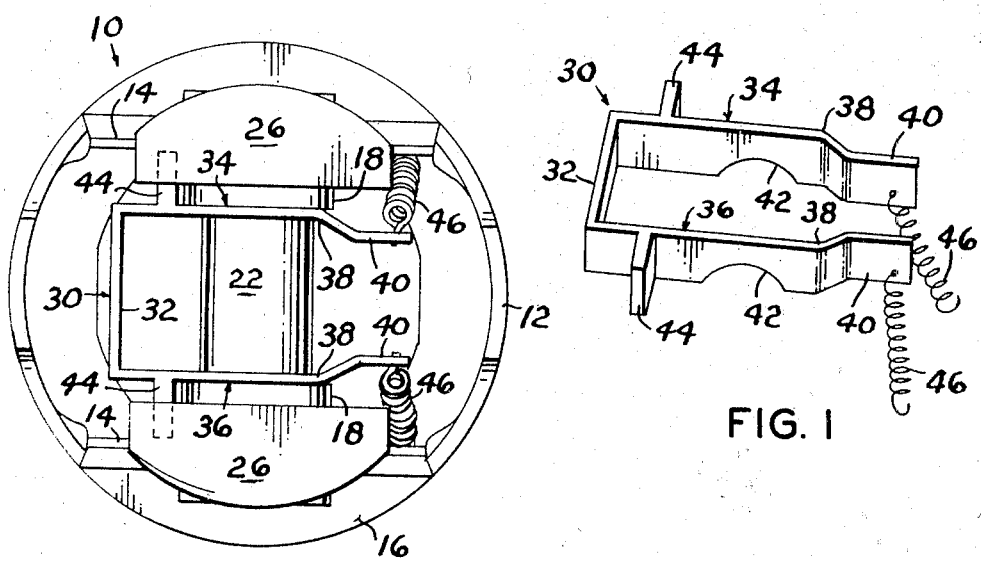
FIGURE 1 is a perspective view of the device, per se.

Like characters of reference designate like parts in those figures of the drawings in which they occur.

In the drawings:

The reference numeral 10 indicates a conventional combustion engine piston having a skirt portion 12 and opposing parallel walls 14 intersecting the skirt portion 12 and defining a piston ring land surface 16. The piston walls 14 are each provided with wrist pin supporting bosses 18 which are line drilled to form wrist pin bearing surfaces 20 which in turn journal a wrist pin 22. Apertures or openings 24 are formed in the respective piston wall portion adjacent the piston ring land 16 at their juncture with the skirt 12. The piston is further provided with a pair of integrally connected wrist pin area reinforcing lugs 26 which extend horizontally across the respective piston wall portion 14. The above description is conventional with most reciprocating pistons and is set forth to show the structure with which the present invention is intended to be used.

The reference numeral 30 indicates the device, as a whole, which is substantially U-shaped in general configuration. In the preferred embodiment, the bracket 30 is formed of strap-like material substantially rectangular in cross section having a thickness substantially less than its width. The bracket 30 includes a bight portion 32 integrally connected with legs 34 and 36 which extend in parallel spaced relation perpendicular with respect to the bight portion 32 toward their free end portions. Adjacent their free end portions each of the legs are curved or bent laterally inward toward each other, as at 38, defining spaced-apart parallel end portions 40. Each of the legs 34 and 36 have one side edge arcuately cut off to form recesses 42 in transversely aligned relation. The recesses 42 are each formed on a radius substantially equal with respect to the radius of the wrist pin 22 for contacting a peripheral portion of the wrist pin as hereinafter explained.

Adjacent the bight end portion of the bracket each of the legs is provided with a prong 44 which extends laterally outward from the legs in aligned relation transversely of the bracket.

The length of the prongs 44 is such that they overlap, in contacting relation, a portion of the normally upwardly disposed surfaces of the respective reinforcing lug 26. A helical tension spring 46 extends between and is connected with the respective free end portion of the leg end portions 40 and the edge surface of the piston wall forming the apertures 24.

Operation

In operation the piston 10 is removed from the engine with the piston rod, not shown, connected with the wrist pin 22. The device 30 is manually positioned on opposing sides of the connected end of the piston rod with the recesses 42 disposed toward the wrist pin. The bight end portion of the bracket is tilted inwardly toward the ring end of the piston so that prongs 44 are positioned in contacting relation against the normally upwardly disposed surfaces of the respective reinforcing lugs 26 while the springs 46, each having one end connected with the leg end portions 40, are engaged by their other end portions with an edge surface of the piston wall forming the apertures 24. The tension of the springs 46 and the contact between the prongs 44 and the reinforcing lugs 26 thus tends to pivot or fulcrum the device 30 about the axis of the wrist pin which maintains a loose wrist pin in contact with its bearings.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In combination with a piston having a wall area which journals a wrist pin and having reinforcing lugs on its wall, the improvement, comprising: a substantially U-shaped bracket having legs extending transversely across said wrist pin; and means fulcruming said legs against said wrist pin.

2. Structure as specified in claim 1 in which said bracket legs are each provided with an outstanding lug contacting the respective wrist pin reinforcing lug, and means connecting the free end portion of said legs with said piston wall.

3. Structure as specified in claim 2 in which the last mentioned means comprises a spring extending between and connected with the free end portion of each said leg and an edge surface of said piston wall.

4. Structure as specified in claim 3 in which the legs of said bracket are each provided with a recess cooperatingly contacting a peripheral portion of said wrist pin for preventing transverse movement of said bracket relative to said wrist pin.

5. Structure as specified in claim 4 in which said bracket is formed of strap-like material having a width substantially greater than its thickness.

References Cited

UNITED STATES PATENTS

| 1,482,868 | 2/1924 | Richard | 92—187 X |
| 1,724,193 | 8/1929 | Hackethal | 92—187 |

CARROLL B. DORITY, JR., *Primary Examiner.*